(12) United States Patent
Billings et al.

(10) Patent No.: US 12,189,566 B2
(45) Date of Patent: Jan. 7, 2025

(54) DATA TRANSFER ASSEMBLIES FOR ROBOTIC DEVICES

(71) Applicant: Boston Dynamics, Inc., Waltham, MA (US)

(72) Inventors: Devin Billings, Waltham, MA (US); Matthew Meduna, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 117 days.

(21) Appl. No.: 18/073,685

(22) Filed: Dec. 2, 2022

(65) Prior Publication Data

US 2024/0184731 A1 Jun. 6, 2024

(51) Int. Cl.
*G06F 13/42* (2006.01)
*B25J 19/02* (2006.01)
*H04L 45/00* (2022.01)
*H04L 45/42* (2022.01)

(52) U.S. Cl.
CPC .......... *G06F 13/4221* (2013.01); *H04L 45/00* (2013.01); *H04L 45/42* (2013.01); *B25J 19/02* (2013.01); *G06F 2213/0026* (2013.01)

(58) Field of Classification Search
CPC .......... G06F 13/4221; G06F 2213/0026; B25J 19/02; H04L 45/00; H04L 45/42
See application file for complete search history.

(56) References Cited

U.S. PATENT DOCUMENTS

| | | | | |
|---|---|---|---|---|
| 2005/0234592 A1* | 10/2005 | McGee | .................. | G05D 1/027 700/245 |
| 2008/0263628 A1* | 10/2008 | Norman | ................. | G08C 17/02 726/1 |
| 2010/0146170 A1* | 6/2010 | Brown | ................ | G06F 13/4022 710/105 |
| 2021/0276184 A1* | 9/2021 | Chan | ....................... | H04J 14/02 |
| 2023/0281081 A1* | 9/2023 | Ahn | ..................... | G06F 11/1448 |

FOREIGN PATENT DOCUMENTS

CN 106078746 A * 11/2016
CN 114918938 A 8/2022

OTHER PUBLICATIONS

Translation and original document for CN 106078746 A (Year: 2016).*
Tauro, "Technologies High Data Rate Rotary Joint Design," Apr. 5, 2021, 5 pgs.
International Search Report and Written Opinion from the International Searching Authority for Appliction No. PCT/US2023/081114, dated Apr. 18, 2024.

* cited by examiner

*Primary Examiner* — Glenn A. Auve
(74) *Attorney, Agent, or Firm* — PIERCE ATWOOD LLP (57) ABSTRACT

The invention includes systems and methods for routing data packets in a robot. The method comprises routing, using a first switching device, data packets between a first host processor and a first electronic device of the robot, and routing, using the first switching device, data packets between a second host processor and a second electronic device of the robot.

20 Claims, 8 Drawing Sheets

DATA TRANSFER ASSEMBLIES FOR ROBOTIC DEVICES

TECHNICAL FIELD

This disclosure relates generally to robotics and more specifically to systems, methods and apparatuses, including computer programs, for transferring data associated with robotic devices.

BACKGROUND

A robot is generally defined as a reprogrammable and multifunctional manipulator designed to move material, parts, tools, and/or specialized devices (e.g., via variable programmed motions) for performing tasks. Robots may include manipulators that are physically anchored (e.g., industrial robotic arms), mobile devices that move throughout an environment (e.g., using legs, wheels, or traction-based mechanisms), or some combination of one or more manipulators and one or more mobile devices. Robots are currently used in a variety of industries, including, for example, manufacturing, warehouse logistics, transportation, hazardous environments, exploration, and healthcare.

SUMMARY

In some scenarios it can be helpful to have one or more sensors (e.g., depth and/or visual sensors) in one or more distal locations on a robot (e.g., downstream from one or more robotic joints, such as in the "palm" of a robotic gripper hand). Such sensors can provide additional vantage points that enable the robot (and/or robot operator) to better understand its environment and/or specify desired robotic manipulation operations. Previously, it has been difficult to support these kinds of distal sensors. First, providing power and/or data transfer capabilities to these sensors has required custom cable routing schemes for each specific hardware configuration. Second, such cable routing schemes can impose additional constraints, such as limiting the available rotation range of the robotic joints and/or increasing the configuration's susceptibility to physical wear-and-tear over time (e.g., because of abrasions to the custom cables).

Another issue is that each of the joints in a robot has typically required a data connection to the central processing unit (CPU) of the robot, which is typically located in the body or the base of the robot. Some robots have used a controller area network (CAN) to send data to and/or from the various controllers in the robot (e.g., motor controllers in the robot's joints). However, such systems have had limitations on the available data rate (e.g., they have been lower than 100 Mbps), which has in turn limited the richness and/or utility of the data that can be transferred, particularly to and/or from distal locations on the robot.

The present invention includes systems, methods and apparatuses, including computer programs, for transferring robotic device data via electromagnetic waves (e.g., visible light and/or radio waves) across a medium (e.g., free air and/or a waveguide). In one illustrative embodiment, an optical transceiver system is embedded in an actuator of a robot. The optical transceiver system is used to transfer data signals across a joint (e.g., a joint near and/or coupled to an actuator) using electromagnetic radiation (e.g., instead of stringing wires across the equivalent location in the joint and/or actuator). Such a configuration can provide advantages over prior setups. One advantage is that by removing a mechanical constraint on rotation, the joint can rotate continuously (e.g., 360 degrees or more), substantially increasing the available workspace of the attached member (e.g., robotic limb or manipulator). For example, a manipulator arm that is free to rotate continuously can act as a drill or continuous valve turner. As another example, an industrial arm with links that are free to rotate continuously can plan trajectories in an expanded space of possible movement, ultimately creating more efficient trajectories. As a third example, a humanoid robot with a head that can turn in any direction can easily gather sensor data from a wider field of view without having to reorient its body. Such examples are non-limiting, and many other examples will be readily apparent to one having ordinary skill in the art.

In some embodiments, such as those described above, it can be possible to route a data transfer pathway (e.g., a single lane of PCI express ("PCIe")) across one or more joints of a robot (e.g., all the way down an articulated limb of the robot). However, in some embodiments, a number of other data transfer constraints also exist—e.g., each PCIe lane originates from a host processor, which makes it difficult or impossible to support different sensors with different processors. For optimal performance, it can be desirable to support a first sensor (e.g., a depth camera) with a first host processor and a second sensor (e.g., a RGB camera) with a second host processor (and so on for additional sensors and processors, if desired). In some embodiments, it can be ideal to support each device with its own dedicated host processor, rather than to be fundamentally limited in the number of processors that can be included in the robot.

In addition, in some embodiments, such as those described above, one or more switch architectures can be implemented that allow dedicated processors to support unique sensor devices with which they communicate. For example, one processor can support one or more actuator controllers and another processor can support one or more devices responsible for perception, navigation, and/or object classification (with direct access to image data). Such architectures can enable substantially more kinematic data and/or sensor data to be used, regardless of where the sensors are physically located on the robot, and can flexibly expand in the future. In some embodiments, PCIe (e.g., Gen 3 or Gen 2) can be routed through the robot's limbs and/or joints. In some embodiments, multiple robot joints can be connected mechanically (e.g., in series) and/or can support cameras or other data-rich sensors anywhere along the signal chain. In some embodiments, a USB (e.g., USB 3.0 or USB 2.0) or Ethernet configuration can be used in place of, and/or in addition to, PCIe.

In one aspect, the invention features an electronic circuit for a robot. The electronic circuit includes a switching device, and a set of two or more host processors. The switching device is configured to (i) route data packets between a first host processor and a first electronic device of the robot, and (ii) route data packets between a second host processor and a second electronic device of the robot.

In some embodiments, the switching device comprises a PCIe switching device. In some embodiments, the electronic circuit further comprises the first host processor and the second host processor. In some embodiments, the electronic circuit further comprises the first electronic device of the robot and the second electronic device of the robot. In some embodiments, the first electronic device of the robot further comprises a perception sensor and the second electronic device of the robot comprises a robotic actuator. In some embodiments, the switching device includes multiple ports. In some embodiments, the electronic circuit further comprises an electromagnetic wave transmitter and a an electromagnetic wave receiver, wherein the switching device is coupled to at least one of the receiver or the transmitter. In some embodiments, the electronic circuit further comprises a first sensor and a second sensor, and the first and second sensors are electronically coupled to the switching device, and the switching device is coupled to at least one of the transmitter or the receiver. In some embodiments, the switching device is located within or adjacent to a first robotic joint. In some embodiments, the electronic circuit further comprises a robot processor in electronic communication with the switching device, wherein data traffic routed through the switching device is controlled by a configuration file executing on the robot processor.

In one aspect, the invention features a method of routing data packets in a robot. The method comprises routing, using a first switching device, data packets between a first host processor and a first electronic device of the robot, and routing, using the first switching device, data packets between a second host processor and a second electronic device of the robot.

In some embodiments, the first switching device comprises a PCIe switching device. In some embodiments, the first electronic device of the robot comprises a perception sensor and the second electronic device of the robot comprises a robotic actuator. In some embodiments, the first switching device includes multiple ports. In some embodiments, the first switching device is coupled to at least one of an electromagnetic wave receiver or an electromagnetic wave transmitter. In some embodiments, the first switching device is located within or adjacent to a first robotic joint. In some embodiments, the method further comprises controlling, by a configuration file executing on a robot processor, routing of data traffic through the first switching device. In some embodiments, the method further comprises routing, using a second switching device, data packets between the first host processor and a third electronic device of the robot, and routing, using the third switching device, data packets between the second host processor and a fourth electronic device of the robot. In some embodiments, the second switching device comprises a PCIe switching device. In some embodiments, the method further comprises controlling, by the configuration file executing on the robot processor, routing of data traffic through the second switching device.

In one aspect, the invention features an assembly for a robot. The assembly includes a first member including an electromagnetic wave transmitter configured to transmit a data signal, and a second member coupled to the first member at a first robotic joint, the second member including an electromagnetic wave receiver configured to receive the data signal. The transmitter and the receiver are configured to operate at a data rate of at least 100 Mbps.

In some embodiments, the first member comprises at least one of a robot body or a robot limb. In some embodiments, the second member comprises at least one of a robot end effector or a robot limb. In some embodiments, the assembly further includes a third member coupled to the second member at a second robotic joint, wherein the second member comprises a robot limb and the third member comprises at least one of a robot end effector or another robot limb.

In some embodiments, the transmitter is enclosed by the first member and the receiver is enclosed by the second member. In some embodiments, the transmitter is coaxial or parallel with the first member and the receiver is coaxial or parallel with the second member. In some embodiments, the transmitter is configured to transmit the signal across the robotic joint to the receiver. In some embodiments, the transmitter is configured to transmit the signal over air to the receiver. In some embodiments, the transmitter is configured to transmit the signal through a waveguide to the receiver. In some embodiments, the transmitter and the receiver are optical devices. In some embodiments, the transmitter comprises a first optical transceiver and the receiver comprises a second optical transceiver. In some embodiments, the transmitter and the receiver are radio devices. In some embodiments, the transmitter comprises a first radio transceiver and the receiver comprises a second radio transceiver. In some embodiments, the transmitter and the receiver are configured to support PCI Express (PCIe) devices.

In some embodiments, the assembly further comprises a switch electronically coupled to the transmitter, the switch including multiple ports. In some embodiments, the transmitter and the receiver are configured to support Ethernet devices. In some embodiments, the transmitter and the receiver are configured to support universal serial bus (USB) devices. In some embodiments, the transmitter and the receiver are configured to support controller area network (CAN) devices. In some embodiments, at least one of the first member or the second member is rotatable about the robotic joint. In some embodiments, the transmitter is enclosed in a first actuator of the first member and the receiver is enclosed in a second actuator of the second member. In some embodiments, the data signal is configured to travel within an interior region of the first actuator and an interior region of the second actuator. In some embodiments, the assembly further includes a first processor electronically coupled to the transmitter. In some embodiments, the assembly further includes a first sensor electronically coupled to the receiver.

In some embodiments, the assembly further includes a first processor and a second processor, wherein the first and second processors are electronically coupled to a data network switch, and the data network switch is coupled to at least one of the receiver or the transmitter. In some embodiments, the assembly further includes a first sensor and a second sensor, wherein the first and second sensors are electronically coupled to the data network switch, and the data network switch is coupled to at least one of the transmitter or the receiver. In some embodiments, the data network switch is configured to route, through a single node, first data traffic between the first sensor and the first processor and second data traffic between the second sensor and the second processor. In some embodiments, the data network switch is located within or adjacent to the first robotic joint. In some embodiments, data traffic routed through the data network switch is controlled by a configuration file executing on a robot processor in electronic communication with the data network switch.

In some embodiments, at least one of the first member or the second member is configured to rotate continuously about the first robotic joint. In some embodiments, the transmitter is configured to transmit data through at least one of (i) a free air medium, an optical fiber, an optical waveguide, or a radio frequency waveguide. In some embodiments, at least one of the following applies: (i) PCIe is interfaced to a USB host controller; (ii) PCIe is interfaced to an Ethernet adapter; (iii) PCIe is interfaced to a FGPA; (iv) Ethernet is interfaced to a microprocessor; (v) PCIe is interfaced to a microprocessor; (vi) Ethernet is interfaced to a CPU; (vii) PCIe is interfaced to a MIPI bridge device; (viii) a joint of a robot includes a PCIe to enable connection of multiple additional devices to a single PCIe upstream lane; (ix) a joint of a robot includes an Ethernet switch to enable connection of multiple additional devices to a single upstream Ethernet interface. In some embodiments, the transmitter and the receiver are configured to operate at a data rate of at least 250 Mbps. In some embodiments, the transmitter and the receiver are configured to operate at a data rate of at least 500 Mbps. In some embodiments, the transmitter and the receiver are configured to operate at a data rate of at least 1 Gbps.

In one aspect, the invention features a robot including the assembly of any of the preceding assembly concepts. In some embodiments, the robot is at least one of a humanoid, a biped, a quadruped, a wheeled robot, a tracked robot, or a mobile manipulator robot.

In one aspect, the invention features a method. The method comprises transmitting a data signal from an electromagnetic wave transmitter arranged in a first member of a robot to an electromagnetic wave receiver configured to receive the data signal. The receiver is arranged in a second member of the robot and is coupled to the first member at a first robotic joint, and the transmitter and the receiver are configured to operate at a data rate of at least 100 Mbps.

In some embodiments, the first member comprises at least one of a robot body or a robot limb. In some embodiments, the second member comprises at least one of a robot end effector or a robot limb. In some embodiments, the robot further comprises a third member coupled to the second member at a second robotic joint, wherein the second member comprises a robot limb and the third member comprises at least one of a robot end effector or another robot limb. In some embodiments, transmitting the data signal comprises transmitting the data signal across the first robotic joint to the receiver. In some embodiments, transmitting the data signal comprises transmitting the data signal over air to the receiver. In some embodiments, transmitting the data signal comprises transmitting the data signal through a waveguide to the receiver.

In some embodiments, the transmitter is enclosed in a first actuator of the first member and the receiver is enclosed in a second actuator of the second member, and transmitting the data signal comprises transmitting the data signal within an interior region of the first actuator and an interior region of the second actuator. In some embodiments, the robot includes a first processor and a second processor, the first and second processors are electronically coupled to a data network switch, the data network switch is coupled to at least one of the receiver or the transmitter, and the method further comprises routing using the data network switch, first data traffic between a first sensor and the first processor and second data traffic between a second sensor and the second processor. In some embodiments, the method further comprises controlling, by a configuration file executing on a robot processor in electronic communication with the data network switch, data traffic routed through the data network switch.

In some embodiments, transmitting the data signal comprises transmitting the data signal through at least one of (i) a free air medium, an optical fiber, an optical waveguide, or a radio frequency waveguide. In some embodiments, the transmitter and the receiver are configured to operate at a data rate of at least 250 Mbps. In some embodiments, the transmitter and the receiver are configured to operate at a data rate of at least 500 Mbps. In some embodiments, the transmitter and the receiver are configured to operate at a data rate of at least 1 Gbps.

In one aspect, the invention features a computing device for a robot. The computing device includes at least one computer processor, and at least one non-transitory computer-readable medium encoded with instructions that, when executed by the at least one computer processor perform any of the methods described herein.

In one aspect, the invention features a robotic component. The robotic component includes a first robotic joint at which a first member including a first electromagnetic wave transmitter configured to transmit a data signal and a second member including a first electromagnetic wave receiver configured to receive the data signal are coupled, and a second robotic joint at which the second member including a second electromagnetic wave transmitter configured to transmit the data signal and a third member including a second electromagnetic wave receiver configured to receive the data signal are coupled. Each of the first transmitter, the second transmitter, the first receiver and the second receiver is configured to operate at a data rate of at least 100 Mbps.

In some embodiments, the first member comprises at least one of a robot body or a robot limb. In some embodiments, the second member comprises at least one of a robot end effector or a robot limb. In some embodiments, the second member comprises a robot limb and the third member comprises at least one of a robot end effector or another robot limb. In some embodiments, the first member comprises a robot body, the second member comprises a robot limb, and the third member comprises a robot end effector. In some embodiments, the robotic component comprises one of a robotic arm, a robotic wrist, a robotic leg, or a robotic neck. In some embodiments, the first transmitter is coaxial or parallel with the first member and the first receiver is coaxial or parallel with the second member. In some embodiments, the first transmitter is configured to transmit the data signal across the first robotic joint to the first receiver, and the second transmitter is configured to transmit the data signal across the second robotic joint to the second receiver. In some embodiments, the first transmitter is configured to transmit the data signal over air to the first receiver, and the second transmitter is configured to transmit the data signal over air to the second receiver. In some embodiments, the first transmitter is configured to transmit the data signal through a first waveguide to the first receiver, and the second transmitter is configured to transmit the data signal through a second waveguide to the second receiver. In some embodiments, the first transmitter, the second transmitter, the first receiver and the second receiver are optical devices. In some embodiments, the first transmitter comprises a first optical transceiver, the second transmitter comprises a second optical transceiver, the first receiver comprises a third optical transceiver, and the second receiver comprises a fourth optical transceiver.

In some embodiments, the first transmitter, the second transmitter, the first receiver and the second receiver are radio devices. In some embodiments, the first transmitter comprises a first radio transceiver, the second transmitter comprises a second radio transceiver, the first receiver comprises a third radio transceiver, and the second receiver comprises a fourth radio transceiver. In some embodiments, the first transmitter, the second transmitter, the first receiver, and the second receiver are configured to support PCI Express (PCIe) devices. In some embodiments, the first robotic joint further comprises a switch electronically coupled to the first transmitter, the switch including multiple ports. In some embodiments, the first transmitter, the second transmitter, the first receiver, and the second receiver are configured to support Ethernet devices. In some embodiments, the first transmitter, the second transmitter, the first receiver, and the second receiver are configured to support universal serial bus (USB) devices. In some embodiments, the first transmitter, the second transmitter, the first receiver, and the second receiver are configured to support controller area network (CAN) devices. In some embodiments, at least one of the first member or the second member is rotatable about the first robotic joint, and at least one of the second member or the third member is rotatable about the second robotic joint.

In some embodiments, the first transmitter is enclosed in a first actuator of the first member, the first receiver is enclosed in a second actuator of the second member, the second transmitter is enclosed in a third actuator of the second member, and the second receiver is enclosed in a fourth actuator of the third member. In some embodiments, the data signal is configured to travel within an interior region of the first actuator and an interior region of the second actuator at the first robotic joint, and the data signal is configured to travel within an interior region of the third actuator and an interior region of the fourth actuator at the second robotic joint. In some embodiments, the robotic component further comprises a first processor electronically coupled to the first transmitter. In some embodiments, the robotic component further comprises a first sensor electronically coupled to the first receiver.

In some embodiments, the robotic component further comprises a first processor and a second processor, wherein the first and second processors are electronically coupled to a data network switch, and the data network switch is coupled to at least one of the first receiver, the second receiver, the first transmitter or the second transmitter. In some embodiments, the robotic component further comprises a first sensor and a second sensor, wherein the first and second sensors are electronically coupled to the data network switch. In some embodiments, the data network switch is configured to route, through a single node, first data traffic between the first sensor and the first processor and second data traffic between the second sensor and the second processor. In some embodiments, the data network switch is located within or adjacent to the first robotic joint or the second robotic joint. In some embodiments, data traffic routed through the data network switch is controlled by a configuration file executing on a robot processor in electronic communication with the data network switch. In some embodiments, at least one of the first member or the second member is configured to rotate continuously about the first robotic joint, and at least one of the second member or the third member is configured to rotate continuously about the second robotic joint. In some embodiments, the first transmitter, the second transmitter, the first receiver and the second receiver are configured to operate at a data rate of at least 250 Mbps. In some embodiments, the first transmitter, the second transmitter, the first receiver and the second receiver are configured to operate at a data rate of at least 500 Mbps. In some embodiments, the first transmitter, the second transmitter, the first receiver and the second receiver are configured to operate at a data rate of at least 1 Gbps.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

DETAILED DESCRIPTION

An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device). For instance, the control system may determine locations at which to place the robotic device's feet and/or the force to exert by the robotic device's feet on a surface based on the aggregate orientation.

In some implementations, the robotic device may include force sensors that measure or estimate the external forces (e.g., the force applied by a leg of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

The control system may be configured to actuate one or more actuators connected across components of a robotic leg. The actuators may be controlled to raise or lower the robotic leg. In some cases, a robotic leg may include actuators to control the robotic leg's motion in three dimensions. Depending on the particular implementation, the control system may be configured to use the aggregate orientation, along with other sensor measurements, as a basis to control the robot in a certain manner (e.g., stationary balancing, walking, running, galloping, etc.).

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

Figure 1:
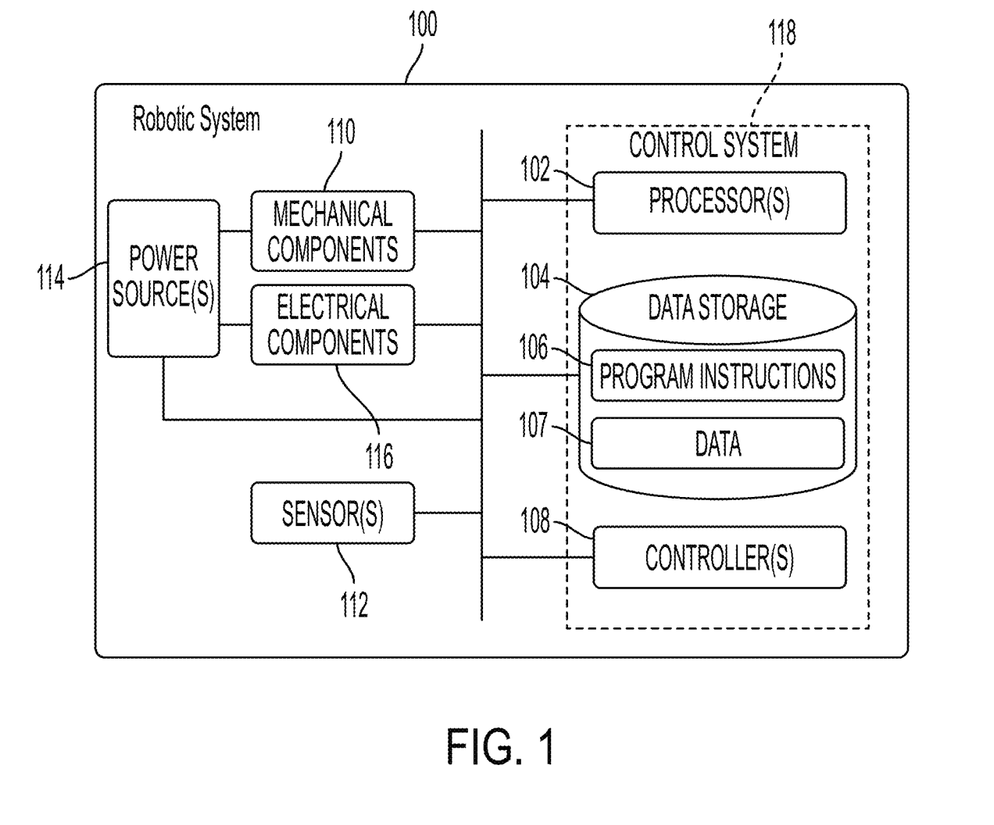
FIG. 1 illustrates an example configuration of a robotic device, according to an illustrative embodiment of the invention.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations, and could be part of an exoskeleton or human assisting device.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device.

Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic system 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100. The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources. Any type of power source may be used to power the robotic system 100, such as electrical power or a gasoline engine. Additionally or alternatively, the robotic system 100 may include a hydraulic system configured to provide power to the mechanical components 110 using fluid power. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials. The body and/or the other components may include or carry the sensor(s) 112. These sensors may be positioned in various locations on the robotic system 100, such as on the body and/or on one or more of the appendages, among other examples.

On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
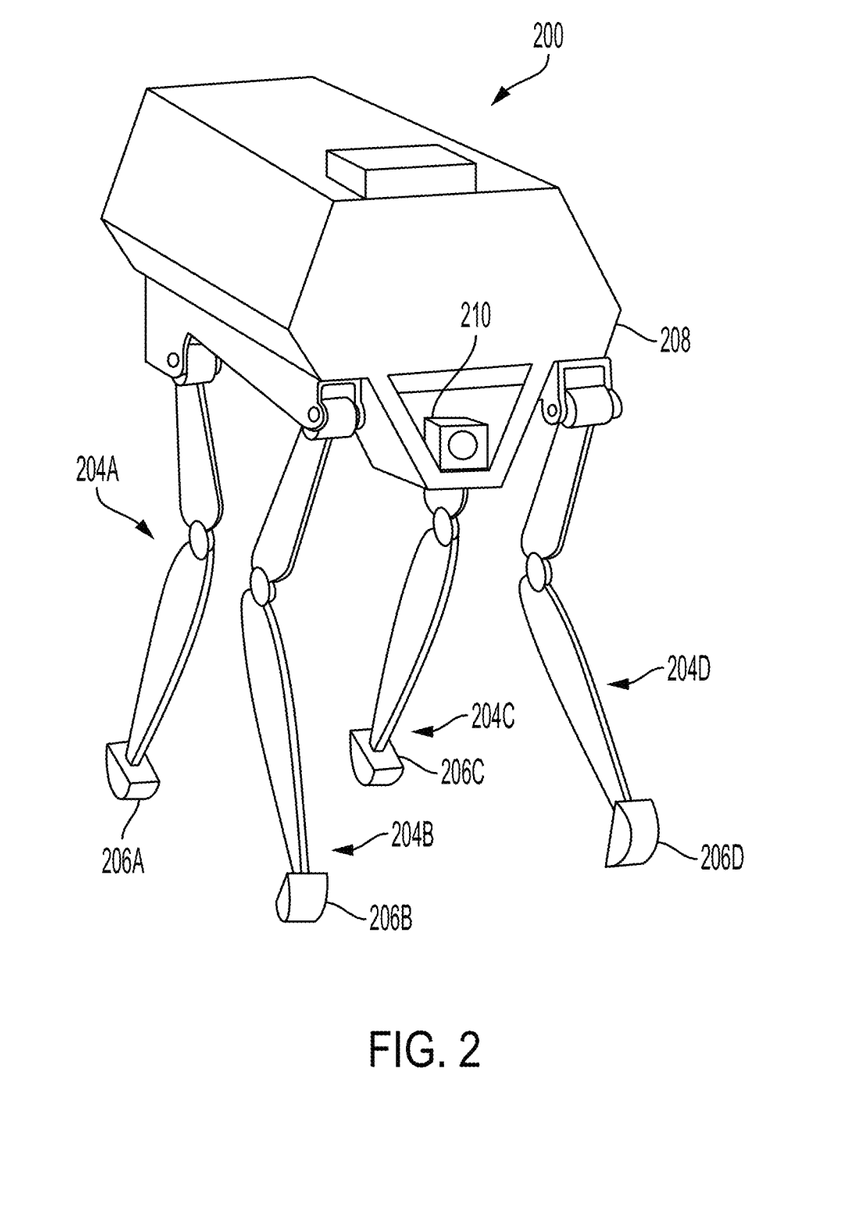
FIG. 2 illustrates an example of a quadruped robot, according to an illustrative embodiment of the invention.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems. The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency. Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
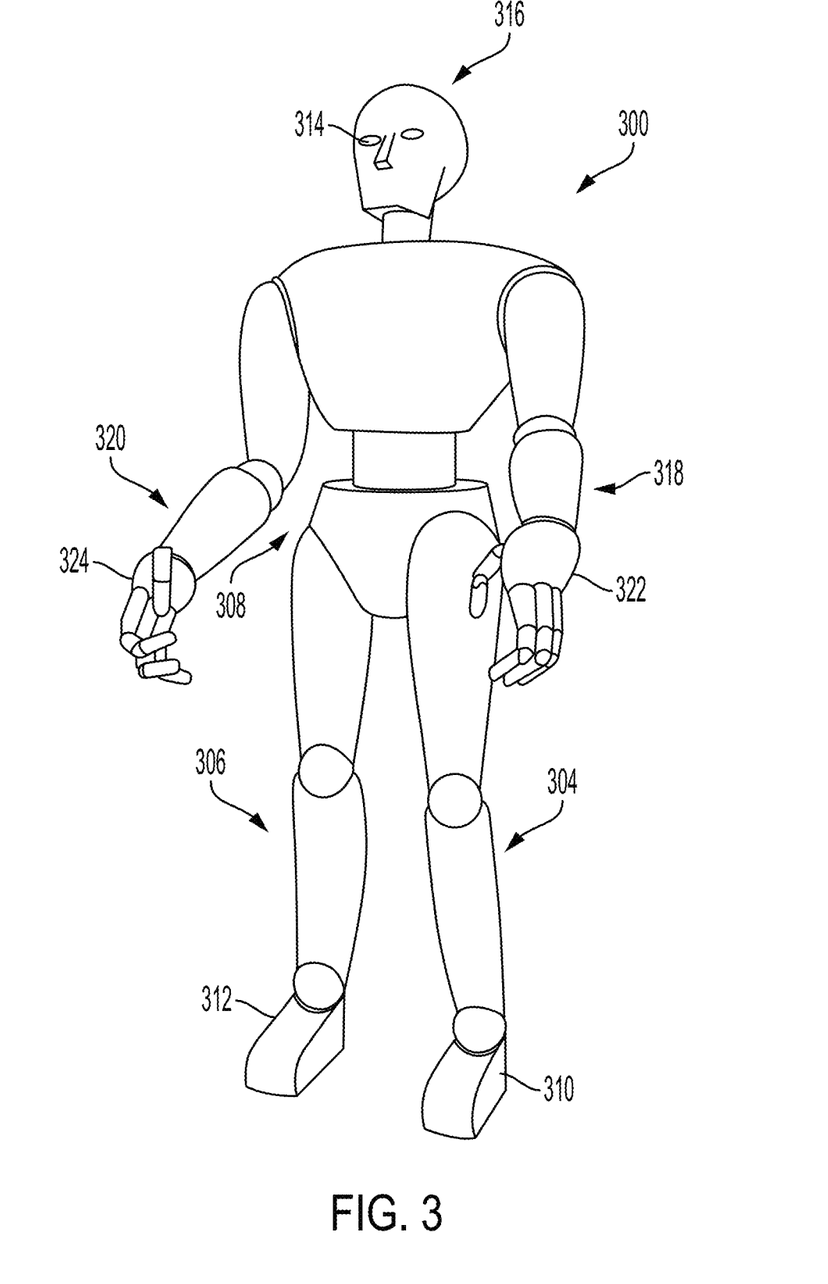
FIG. 3 illustrates an example of a biped robot, according to an illustrative embodiment of the invention.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118. For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 (or end-effectors) for gripping, turning, pulling, and/or pushing objects. The hands 322 and 324 may include various types of appendages or attachments, such as fingers, grippers, welding tools, cutting tools, and so on. The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

Figure 4A:
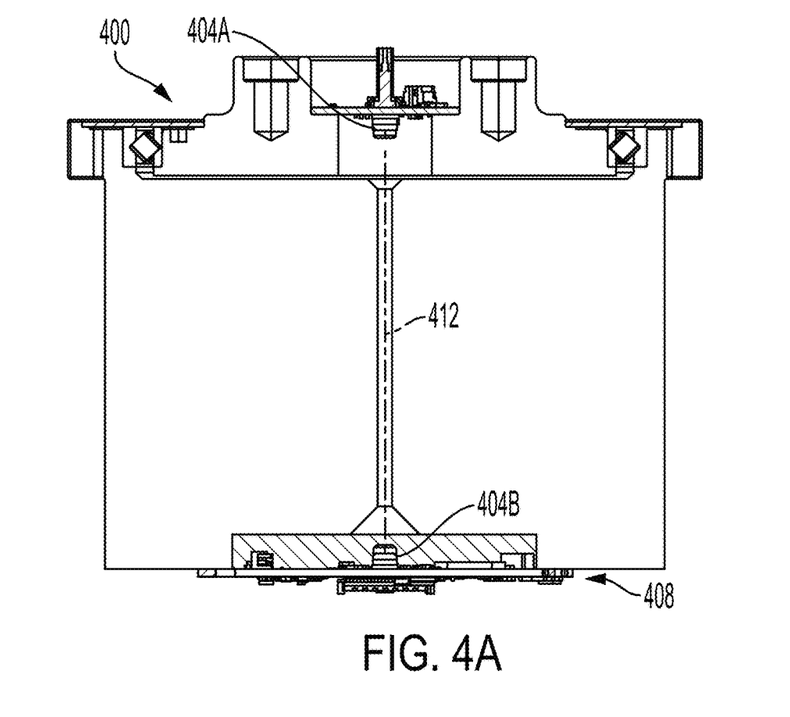
FIG. 4A illustrates an example cross-section of a robot actuator that includes a set of electromagnetic wave transmitters and/or receivers configured to send electromagnetic wave signals over free air within the actuator, according to an illustrative embodiment of the invention.
Figure 4B:
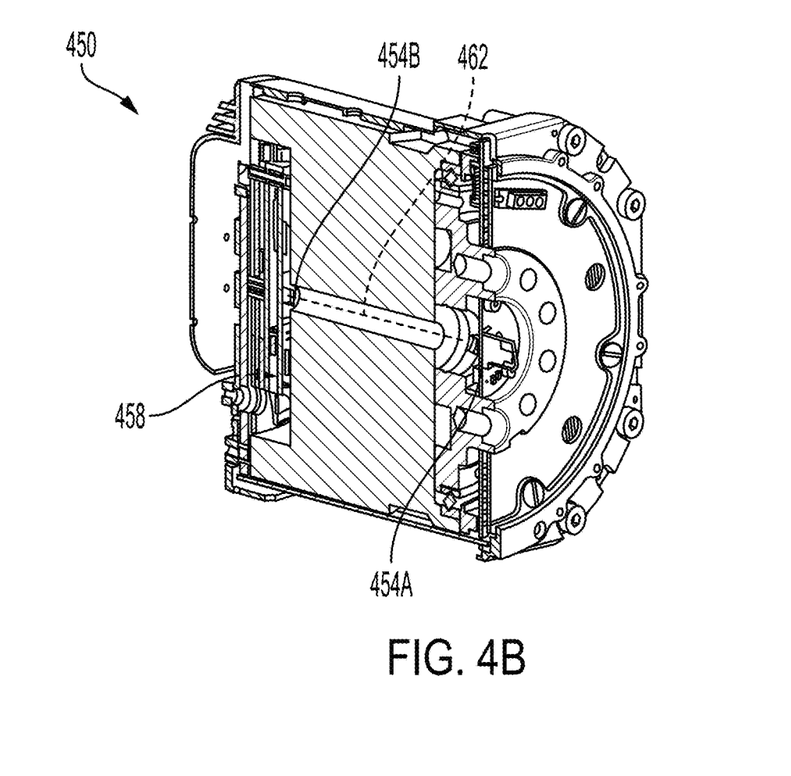
FIG. 4B illustrates an example perspective half sectional view of a robot actuator that includes a set of electromagnetic wave transmitters and/or receivers configured to send electromagnetic wave signals over free air within the actuator, according to an illustrative embodiment of the invention.

FIG. 4A illustrates an example cross-section of a robot actuator 400 that includes a set of electromagnetic wave transmitters and/or receivers (e.g., optical transceivers) 404A, 404B configured to send electromagnetic wave signals over free air (and/or a waveguide) within the actuator 400 (e.g., along a path 412 inside of the actuator 400), according to an illustrative embodiment of the invention. Electromagnetic waves having any suitable spectrum or spectra may be used for the signals including, but not limited to, visible light, infrared light, radio waves, or electromagnetic waves having other spectral characteristics. In embodiments including a waveguide, the waveguide may comprise an optical fiber, glass and/or plastic. The robot actuator 400 can include one or more circuits 408 that are configured to operate with the electromagnetic wave transmitters and/or receivers 404A, 404B (although other electromagnetic signal transmitters and/or receivers are possible too). FIG. 4B illustrates an example perspective half sectional view of a robot actuator 450 that includes a set of electromagnetic wave transmitters and/or receivers (e.g., transceivers) 454A, 454B configured to send electromagnetic wave signals over free air within the actuator 450 (e.g., along a path 462 inside of the actuator 450), according to an illustrative embodiment of the invention. The robot actuator 400 can include one or more circuits 458 that are configured to operate with the electromagnetic signal transmitters and/or receivers 454A, 454B.

Figure 5:
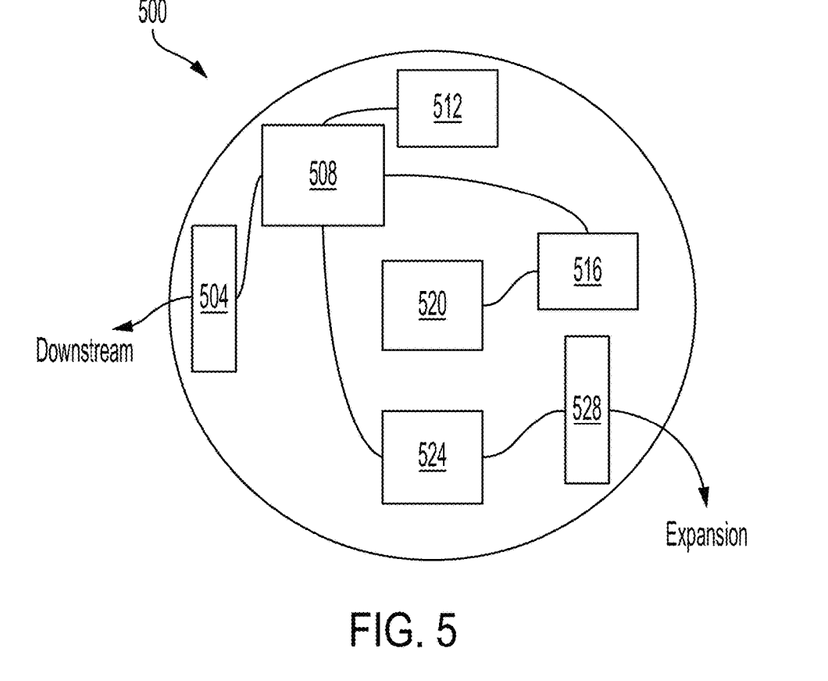
FIG. 5 is a schematic illustration of a circuit including a switching device configured to operate with an electromagnetic signal transmitter and/or receiver, according to an illustrative embodiment of the invention.

FIG. 5 is a schematic illustration of a circuit 500 including a switching device 508 configured to operate with an electromagnetic signal transmitter and/or receiver (e.g., the set of electromagnetic signal transmitters and/or receivers 404A, 404B shown and described above in FIG. 4A and/or the set of electromagnetic signal transmitters and/or receivers 454A, 454B shown and described above in FIG. 4B), according to an illustrative embodiment of the invention. The circuit 500 can be included in an actuator (e.g., the actuator 400 shown and described above in FIG. 4A and/or the actuator 450 shown and described above in FIG. 4B) and/or a robot joint (e.g., as shown and described above in FIGS. 2-3).

The circuit 500 includes a first connector 504 (e.g., a USB 3.0 connector, although a variety of other connectors could be used, such as one supporting Ethernet). The first connector 504 can receive an incoming signal (e.g., a PCIe signal originating from a downstream location in the robot). The first connector 504 is connected to the switching device 508. The switching device 508 can be configured to provide a hardware and/or software framework that expands the number of data lanes from what is available from a host device (or other component) such that multiple devices can be supported by the host and/or such that multiple hosts can be used to support multiple devices. For instance, switching device 508 can be used to map a first sensor device to a first processor and a second sensor device to a second processor (and so on for additional processors and sensor devices, if desired). For example, the switching device 508 can be configured with a configuration file (e.g., an XML configuration file), which can be loaded at boot time and/or can route device packets intelligently (e.g., by a processor executing a real-time operating system) via the switching device 508.

The switching device 508 is connected to a switch configuration device 512. The switch configuration device 512 can be implemented as a microcontroller integrated circuit (e.g., a 32-bit microcontroller). The switching device 508 can also be connected to a signal booster 516. The signal booster 516 can be a PCIe redriver, although a variety of other signal boosters could be used. The signal booster 516 is connected to a transceiver 520 (e.g., the electromagnetic signal transmitter and/or receiver 404A and/or the electromagnetic signal transmitter and/or receiver 404B shown and described above in FIGS. 4A-4B, although a variety of other signal transmitters and/or receivers may be suitable). The transceiver 520 can be implemented as an optical transceiver that supports high-speed data transmission through a medium (e.g., an optical fiber, a waveguide, through the air), although a variety of transmitters and/or receivers can be used. The switching device 508 is also connected to a controller 524. The controller 524 can be a USB controller, although a variety of other controllers could be used (e.g., one supporting Ethernet). The controller 524 is also connected to a second connector 528. Similar to the first connector 504, the second connector 528 can also be a USB 3.0 connector, although a variety of other connectors could be used (e.g., one supporting Ethernet). The circuit 500 may be expandable via the controller 524 and can be configured to be connected to one or more additional devices operating on the robot.

Figure 6:
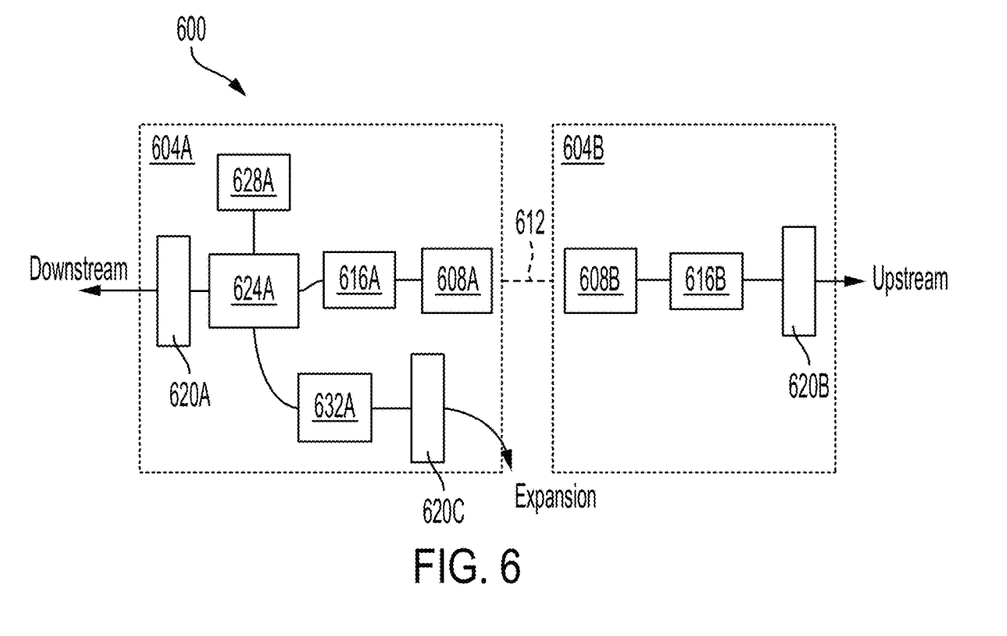
FIG. 6 is a schematic illustration of a configuration including a set of optically connected circuits, according to an illustrative embodiment of the invention.

FIG. 6 is a schematic illustration of a configuration 600 including a set of optically connected circuits 604A, 604B, according to an illustrative embodiment of the invention. The circuits 604A, 604B can each include similar components to the circuit 500 shown above in FIG. 5. In FIG. 6, circuits 604A, 604B each contain an optical transmitter and/or receiver 608A, 608B, respectively (e.g., the transceiver 520 shown and described above in FIG. 5), and together are used to form an optical link 612, which can be implemented over a robotic joint and/or otherwise used to communicate information between circuits 604A, 604B. The circuits 604A, 604B also include signal drivers 616A, 616B (e.g., PCIe redrivers as above in FIG. 5) and connectors 620A, 620B (e.g., USB 3.0 connectors, as above in FIG. 5). As shown, the circuit 604A also includes a switching device 624A, a switching configuration device 628A, a controller 632A, and another connector 620C (e.g., similar to the components shown above in FIG. 5). In some embodiments, the circuit 604B can also include similar elements. In FIG. 6, the connector 620A can connect to one or more components "downstream", such as another similar circuit or a processor (e.g., a host processor, a graphical processing unit (GPU), a payload processor, an actuator controller, a perception processor, a navigation processor, an object classification processor, or another kind of specialized processor). In FIG. 6, the connector 620B can connect to one or more components "upstream", such as another similar circuit or a sensor (e.g., a camera, a visual sensor, a depth sensor, a scalar sensor (such as a radiation level or vibration level), an analog sensor, a digital sensor, or another kind of sensor).

Figure 7A:
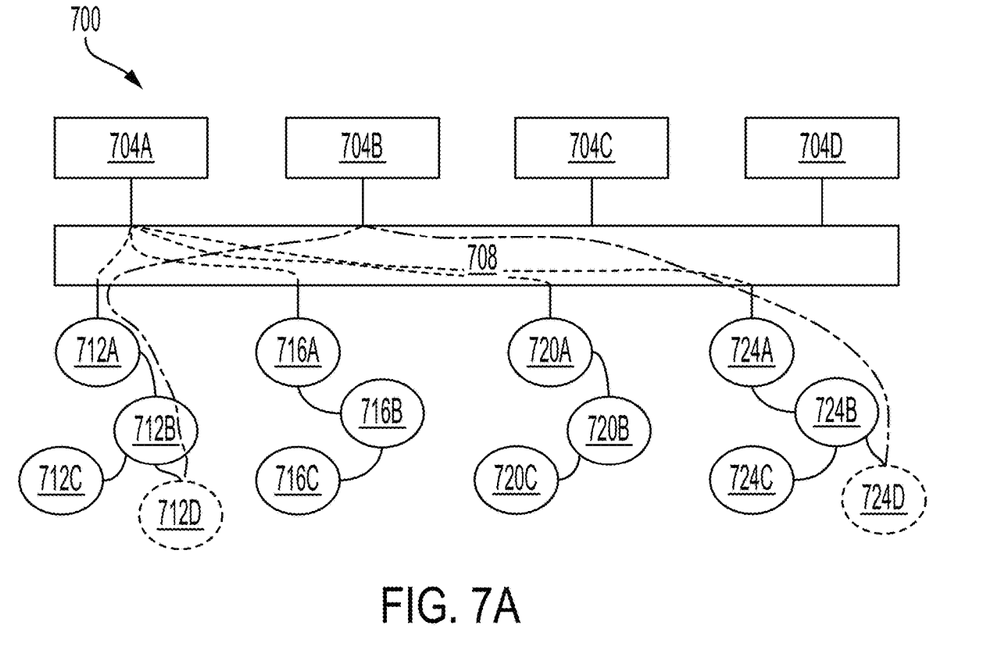
FIG. 7A is a schematic illustration of an architecture for mapping host processors to devices they support via a switching device, according to an illustrative embodiment of the invention.

FIG. 7A is a schematic illustration of an architecture 700 for mapping host processors 704 (e.g., 704A, 704B, as shown, although a different number could be used) to devices they support (e.g., 712D, 724D, as shown, although a different number could be used) via a switching device 708 (e.g., a PCIe switching device), according to an illustrative embodiment of the invention. In FIG. 7A, the host processors 704 include a first processor 704A (e.g., a first robot processor), a second processor 704B (e.g., a second robot processor), a third processor 704C (e.g., a GPU), and a fourth processor 704D (e.g., a processor of payload attached to a robot). Each of these processors can be connected to the switching device 708 via one or more electronic connections. One or more chains of nodes (or "node chains") 712, 716, 720, 724 can also be connected to the switching device 708. In FIG. 7A, the node chain 712 includes nodes 712A-C, where node 712A is connected to the switching device 708, node 712B is connected to node 712A, and node 712C is connected to node 712B. A similar structure is shown for node chains 716, 720 and 724. In nodes 712 and 724, there is also a first sensor 712D connected (e.g., an RGB camera, although a variety of sensors are possible), via node 712B in node chain 712 and a second sensor (e.g., another RGB camera, although a variety of sensors are possible) 724D connected via node 724B in node chain 724. One having ordinary skill in the art will realize that there may be a different number of node chains and/or processors connected to the switching device 708, and each node chain may have a different number of nodes, depending upon a variety of factors relevant to the particular system.

In some embodiments, such as those described above, a single communication chain (e.g., a single lane of PCIe Gen 2) can be routed down an articulated limb of a robot. Taking PCIe as an example, a limitation on some conventional data transfer architectures in robots is that because each PCIe lane originates from a host processor, there is typically no way to map multiple devices located in distal locations around the robot's body to more than one host processor. Some aspects of the present invention enable certain devices to be supported by one processor and other devices to be supported by another processor. Such a feature can greatly expand the compute power available to the various devices of the robot. For example, in FIG. 7A, the architecture shown allows perception devices (e.g., sensors 712D, 724D) to be "mapped" to processor 704B while actuators (e.g., as shown above in FIGS. 4A-4B) are "mapped" to processor 704A. In some embodiments, the switching device 708 is configured with software and/or firmware to enable this function. For example, a PCIe switch can be configured with an XML configuration file that is loaded at boot time, and device data packets can be routed (e.g., by a processor executing a custom real-time operating system in the switching device itself). This configuration can be transparent to robot software after boot, such that each host processor needs no specialized software running other than its native PCIe root complex support.

Figure 7B:
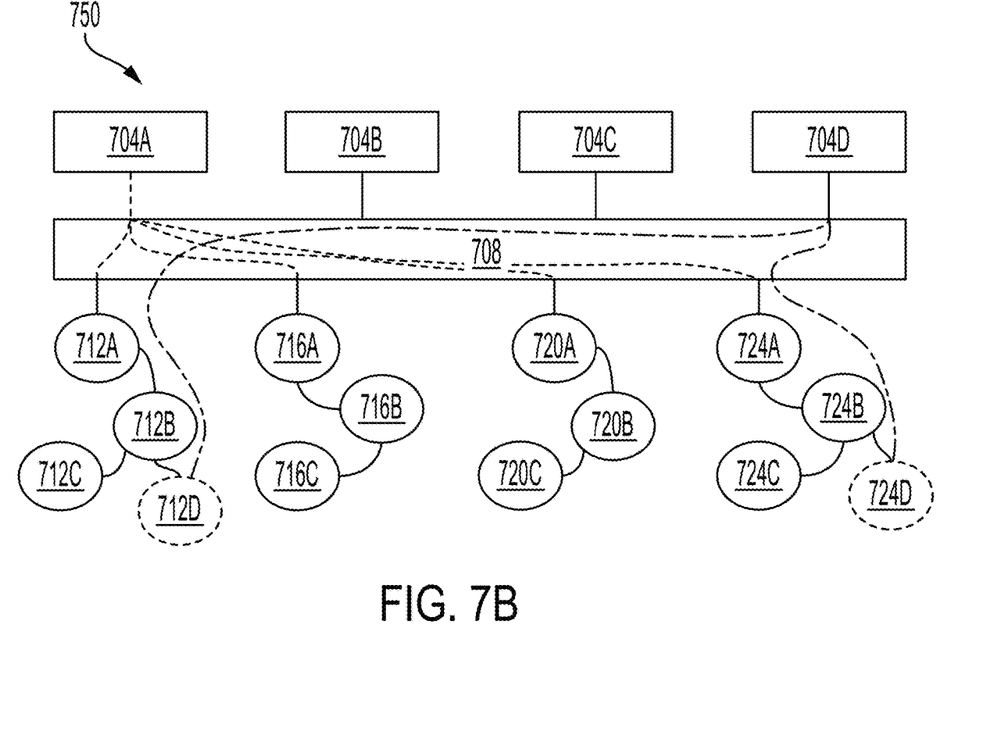
FIG. 7B is another schematic illustration of an architecture for mapping host processors to supported devices via a switching device, according to an illustrative embodiment of the invention.

FIG. 7A shows a configuration in which the switching device 708 connects processor 704A to each of node chains 712, 716, 720, 724, and also connects processor 704B to each of node chains 712 and 724. By comparison, FIG. 7B shows another schematic illustration of a similar hardware configuration 750, and a similar connection scheme between processor 704A and node chains 712, 716, 720, 724, except it differs in that instead of processor 704B being connected to node chains 712, 724, the processor 704D is connected to node chains 712, 724. In this manner, the hardware and/or software architecture shown allows reconfiguration of host processors and/or devices as desired. For example, new perception devices and/or a custom payload computer for dedicated sensor support could be added in the future, such that a computational payload can form a matched pair with a particular sensor type.

Figure 8A:
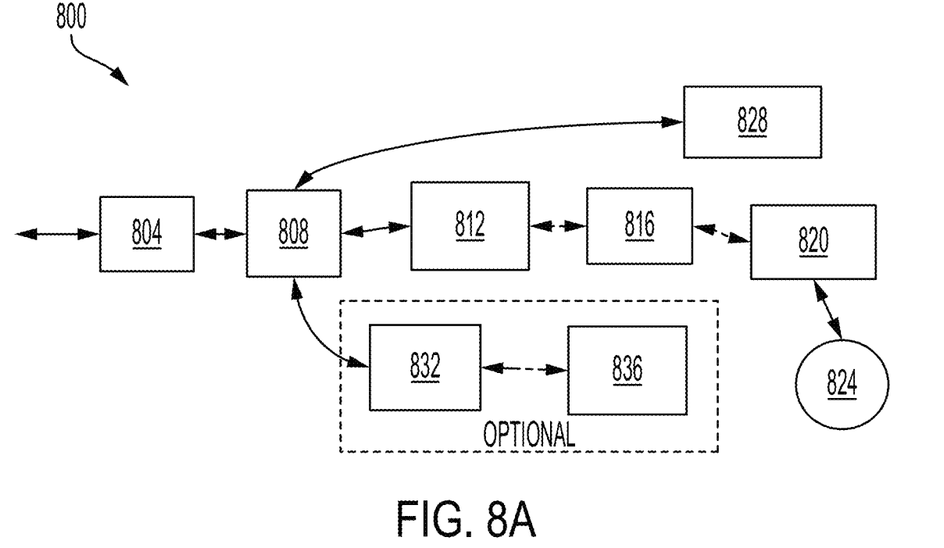
FIG. 8A is a schematic illustration of a hybrid node design architecture including a switching device, according to an illustrative embodiment of the invention.

FIG. 8A is a schematic illustration of a hybrid node design architecture 800 including a switching device (e.g., a PCIe switching device switch 808 shown), according to an illustrative embodiment of the invention. FIG. 8A illustrates one of many flexible ways to implement other data interfaces with PCIe routed down a robot appendage. In FIG. 8A, a PCIe optical link 804 (e.g., run across a robotic joint, as described above) is connected to the PCIe switching device 808, which in turn connects to three different communication branches. In a first branch off of the PCIe switching device 808, a PCIe Ethernet controller 812 is connected to the PCIe switching device 808 over a PCIe connection (e.g., PCIe Gen 2). The PCIe Ethernet controller 812 can be used to instantiate Ethernet ports in desired locations on the robot, e.g., over Ethernet to Ethernet physical layer 816, which is connected to the PCIe Ethernet controller 812 over an Ethernet connection. Such a configuration can permit Ethernet-enabled motor controllers to be used and/or can help actuators to communicate at high data rates. For example, in FIG. 8A, the Ethernet physical layer 816 is connected to a motor drive microcontroller 820 (e.g., over a reduced media-independent interface (RMII)), which is in turn connected to a motor drive power stage 824. In a second branch off of the PCIe switching device 808, a downstream connection device 828 can be connected directly to the PCIe switching device 808 (e.g., by PCIe Gen 2). The downstream connection device 828 can include a number of devices, such as additional implementations of the architecture 800 (e.g., in a chain or series, such that a number of robotic joints in series can be controlled). In a third branch off of the PCIe switching device 808, a USB 3.0 host controller 832 can be connected directly to the PCIe switching device 808 (e.g., by PCIe Gen 2) and implemented to interface to USB 3.0 systems (e.g., a sensor 836, such as aa USB configured depth camera or any other suitable USB camera system).

Figure 8B:
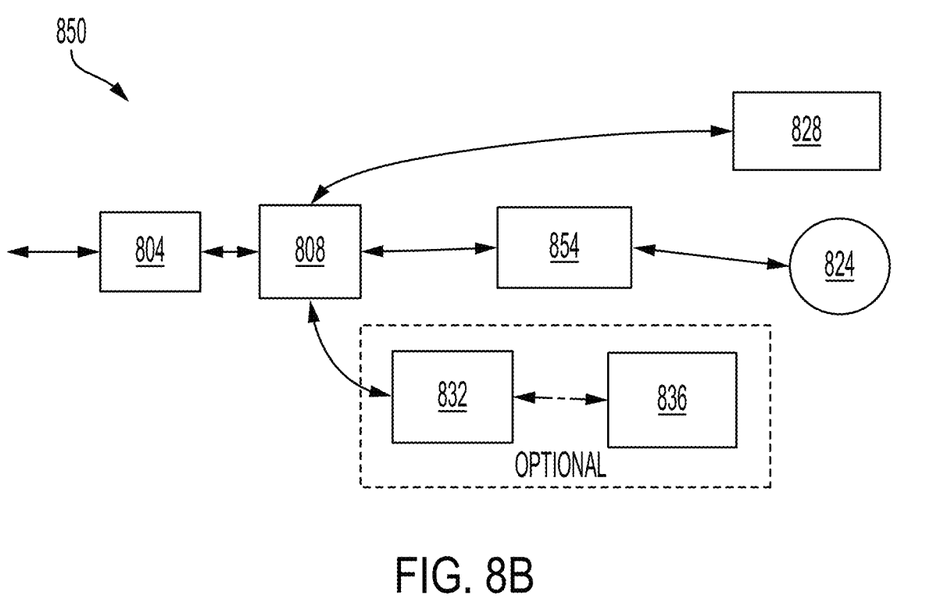
FIG. 8B is a schematic illustration of another hybrid node design architecture including a switching device, according to an illustrative embodiment of the invention.

FIG. 8B is a schematic illustration of another hybrid node design architecture 850 including a switching device (e.g., a PCIe switching device switch 858 shown), according to an illustrative embodiment of the invention. FIG. 8B is similar to FIG. 8A, except it includes one component 854 (e.g., a microcontroller or FPGA) in place of the three components shown above (PCIe Ethernet controller 812, Ethernet physical layer 816, and motor drive microcontroller 820). In cases in which certain components (e.g., one or more microcontrollers) include PCIe interfaces natively, Ethernet devices may not need to be able to adapt PCIe to be able to communicate with those components.

Figure 9:
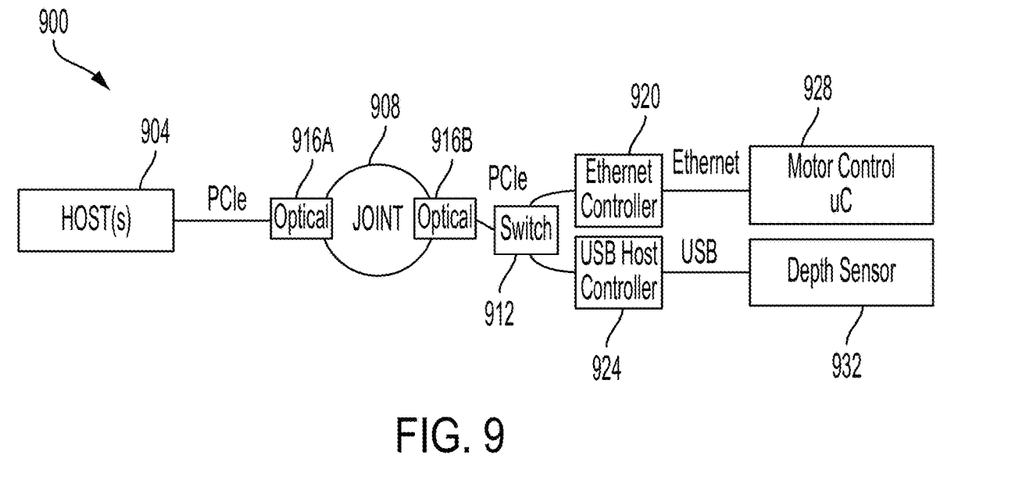
FIG. 9 is a schematic illustration of a configuration including a host processor connected, over a robot joint, to a switching device, according to an illustrative embodiment of the invention.

FIG. 9 is a schematic illustration of a configuration 900 including a host processor 904 connected, over a robot joint 908, to a switching device 912 (e.g., a PCIe switching device), according to an illustrative embodiment of the invention. The host processor 904 sends a signal over the robot joint 908 using optical devices 916A, 916B, which support a PCIe lane. The signal is received at the switching device 912, which is connected to both an Ethernet controller 920 and a USB host controller 924. In this embodiment, the Ethernet controller 920 is connected to a motor controller 928, and the USB host controller 924 is connected to a depth sensor 932, although many other configurations are possible. Generally, with PCIe routed to various locations in a robot, a data network can be provided that enables great flexibility in terms of what peripheral technologies can be integrated into the robot, and FIG. 9 illustrates one example.

Figure 10:
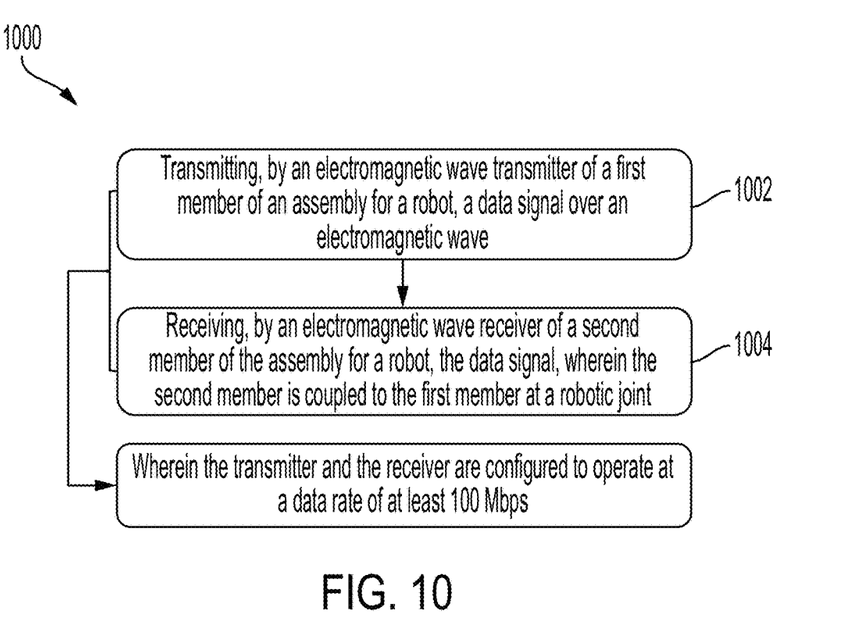
FIG. 10 is a flowchart of an exemplary computer-implemented method, according to an illustrative embodiment of the invention.

FIG. 10 is a flowchart of an exemplary computer-implemented method 1100, according to an illustrative embodiment of the invention. At operation 1002, a data signal is transmitted over an electromagnetic wave by an electromagnetic wave transmitter of a first member of an assembly for a robot. At operation 1004, the data signal is received by an electromagnetic wave receiver of a second member of the assembly for the robot, wherein the second member is coupled to the first member at a robotic joint. The transmitter and the receiver are configured to operate at a data rate of at least 100 Mbps. In some embodiments, the data rate includes an effective data rate or resulting data rate, taking into account a clock rate. In some embodiments, the data rate is at least 250 Mbps, 500 Mbps, 1 Gbps, 2 Gbps, or 5 Gbps.

A number of implementations have been described. Nevertheless, it will be understood that various modifications may be made without departing from the spirit and scope of the disclosure.

The invention claimed is:

1. An electronic circuit for a robot, the electronic circuit comprising:
   a switching device; and
   a set of two or more host processors,
   wherein the switching device is located within or adjacent to a first robotic joint and is configured to:
      (i) route data packets between a first host processor and a first electronic device of the robot, and
      (ii) route data packets between a second host processor and a second electronic device of the robot.

2. The electronic circuit of claim 1, wherein the switching device comprises a PCIe switching device, a USB device or an Ethernet adapter.

3. The electronic circuit of claim 1, further comprising the first host processor and the second host processor.

4. The electronic circuit of claim 1, further comprising the first electronic device of the robot and the second electronic device of the robot.

5. The electronic circuit of claim 1, wherein the first electronic device of the robot comprises a perception sensor and the second electronic device of the robot comprises a robotic actuator.

6. The electronic circuit of claim 1, wherein the switching device includes multiple ports.

7. The electronic circuit of claim 1, further comprising an electromagnetic wave transmitter and an electromagnetic wave receiver, wherein the switching device is coupled to at least one of the electromagnetic wave receiver or the electromagnetic wave transmitter.

8. The electronic circuit of claim 1, further comprising a first sensor and a second sensor, wherein each of the first sensor and the second sensor is electronically coupled to the switching device, and the switching device is coupled to at least one of a transmitter or a receiver.

9. The electronic circuit of claim 1, further comprising a robot processor in electronic communication with the switching device, wherein data traffic routed through the switching device is controlled by a configuration file executing on the robot processor.

10. A method of routing data packets in a robot, the method comprising:
   routing, using a first switching device, data packets between a first host processor and a first electronic device of the robot; and
   routing, using the first switching device, data packets between a second host processor and a second electronic device of the robot,
   wherein the first switching device is located within or adjacent to a first robotic joint of the robot.

11. The method of claim 10, wherein the first switching device comprises a PCIe switching device, a USB device or an Ethernet adapter.

12. The method of claim 10, wherein the first electronic device of the robot comprises a perception sensor and the second electronic device of the robot comprises a robotic actuator.

13. The method of claim 10, wherein the first switching device includes multiple ports.

14. The method of claim 10, wherein the first switching device is coupled to at least one of an electromagnetic wave receiver or an electromagnetic wave transmitter.

15. The method of claim 10, further comprising:
   controlling, by a configuration file executing on a robot processor, routing of data traffic through the first switching device.

16. The method of claim 10, further comprising:
   routing, using a second switching device, data packets between the first host processor and a third electronic device of the robot; and
   routing, using a third switching device, data packets between the second host processor and a fourth electronic device of the robot.

17. The method of claim 16, wherein the second switching device comprises a PCIe switching device.

18. The method of claim 16, further comprising:
   controlling, by a configuration file executing on a robot processor:
   routing of data traffic through the first switching device; and
   routing of data traffic through the second switching device.

19. An electronic circuit for a robot, the electronic circuit comprising:
   a set of switching devices including a first switching device, a second switching device and a third switching device; and
   a set of two or more host processors, wherein
   the first switching device is configured to:
      (i) route data packets between a first host processor and a first electronic device of the robot, and
      (ii) route data packets between a second host processor and a second electronic device of the robot, and
   the second switching device is configured to route data packets between the first host processor and a third electronic device of the robot, and
   the third switching device is configured to route data packets between the second host processor and a fourth electronic device of the robot.

20. A method of routing data packets in a robot, the method comprising:
   routing, using a first switching device, data packets between a first host processor and a first electronic device of the robot;
   routing, using the first switching device, data packets between a second host processor and a second electronic device of the robot;
   routing, using a second switching device, data packets between the first host processor and a third electronic device of the robot; and
   routing, using a third switching device, data packets between the second host processor and a fourth electronic device of the robot.

* * * * *